United States Patent [19]

Yamamoto et al.

[11] Patent Number: 5,579,186
[45] Date of Patent: Nov. 26, 1996

[54] MAGNETIC DISK UNIT AND METHOD FOR CONTROLLING THE SAME

[75] Inventors: Satoshi Yamamoto; Akira Shinjoh, both of Fujisawa; Isao Yoneda, Sagamihara, all of Japan; Arun Sharma, New Rochelle, N.Y.; Muthuthamby Sri-Jayantha, Ossining, N.Y.; Hien P. Dang, Nanuet, N.Y.

[73] Assignee: International Business Machines Corporation, Armonk, N.Y.

[21] Appl. No.: 416,587

[22] Filed: Apr. 3, 1995

Related U.S. Application Data

[63] Continuation of Ser. No. 49,758, Apr. 20, 1993, abandoned.

[30] Foreign Application Priority Data

Apr. 20, 1992 [JP] Japan ..................... 4-099888

[51] Int. Cl.⁶ ..................................... G11B 5/02
[52] U.S. Cl. .......................... 360/75; 360/77.08
[58] Field of Search .............. 360/77.08, 77.05, 360/77.02, 75, 77.04; 369/44.11, 54

[56] References Cited

U.S. PATENT DOCUMENTS 4,737,867  4/1988  Ishikawa et al. ............... 360/75 X
5,140,571  8/1992  Nishida et al. ................. 369/44.11
5,321,560  6/1994  Cowen ........................ 360/77.08 X
5,345,347  9/1994  Hopkins et al. ................ 360/75 X

OTHER PUBLICATIONS

Bob McKnight, "A Track Locating Servo System Utilizing the Data Heads as Absolute Position Transducers," IEEE Transactions on Magnetics, vol. MAG–14, No. 4, Jul. 1978 pp. 182–184.

IBM Technical Disclosure Bulletin, vol. 32, No. 12, May 1990, entitled "Dead-Beat Servo Control By Interleaved Sampling for Hard Disk Drive".

*Primary Examiner*—Aristotelis Psitos
*Assistant Examiner*—James L. Habermehl
*Attorney, Agent, or Firm*—Roy W. Truelson

[57] ABSTRACT

In an idle state, servo information from all sectors is not used, but the servo information from every other sector or from every three or more sectors is used so that head positioning can be performed with only a minimum amount of servo information. The power to the electric circuitry of a write or read system and a servo system, which is not needed in the idle state, is interrupted, from the arrival of the selected servo information to the arrival of the next selected servo information, by a power control signal generated in accordance with the timing of the sectors. The power consumption can be reduced by the amount corresponding to turning off the circuitry not needed, plus the amount needed for computing for position control.

10 Claims, 6 Drawing Sheets

MAGNETIC DISK UNIT AND METHOD FOR CONTROLLING THE SAME

This is a continuation of application Ser. No. 08/049,758, filed Apr. 20, 1993, now abandoned.

FIELD OF THE INVENTION

The present invention relates to a magnetic disk unit employing a sector servo system which performs position control of a head in accordance with servo information disposed in each sector, and more particularly, to a magnetic disk unit and method for controlling the same which uses the servo information skippingly.

BACKGROUND OF THE INVENTION

In a magnetic disk unit employing a sector servo system, which is generally used today, there is provided in sectors of each cylinder servo information containing a track number and a signal for correcting a position between tracks. When no command comes from a host computer, a magnetic disk unit usually performs position control of its head so that the head is held on a certain track in accordance with servo information in each sector. This state is called an idle state. When a command comes from the host computer in this state, the command must be immediately executed.

When a small magnetic disk unit is used in practice, the proportion of time spent in the idle state is very large. In particular, the power consumption of a magnetic disk unit used in a battery-driven notebook type personal computer presents a great problem. In view of this, to reduce power consumption during the idle state in a recent sector servo type magnetic disk unit, the power for write or read circuitry is turned on only for each servo sector and is turned off for each data sector, the remaining section of each sector. Specifically, the power to the write or read circuitry is switched at a fixed duty ratio so as to reduce the power consumption.

The power off ratio of the write or read circuitry however is limited to about 40 –50%. This is because the duty ratio is limited by the length ratio between the servo sector and the data sector.

SUMMARY OF THE INVENTION

Therefore, it is an object of the present invention to provide a magnetic disk unit and method for controlling the same to remarkably reduce the power consumption.

To accomplish the above-mentioned object, the present invention provides a magnetic disk unit employing a sector servo system which performs positioning of a head in accordance with servo information disposed in each sector, the magnetic disk unit comprising: position control means for controlling positioning of the head in response to various commands and the servo information; first servo information processing means for processing the servo information supplied by the head, extracting a track number from the servo information, and supplying the track number to the position control means; second servo information processing means for processing the servo information supplied by the head, extracting from the servo information an offset amount from a track center, and supplying the offset amount to the position control means; data write and read means for supplying a write signal to the head, or for receiving a read signal from the head; identifying means for identifying a particular operation mode of the magnetic disk unit other than a write or read operation, and generating a signal representing the particular operation mode; and selection means for controlling, in response to the signal, the first and second servo information processing means so as to selectively supply the servo information to the position control means, wherein the position control means controls the position of the head on the basis of the servo information selected by the selection means.

In addition, the magnetic disk unit may further comprise means for interrupting an operation of at least a part of the data write and read means and the second servo information processing means except when the selection means supplies the servo information to the position control means.

Furthermore, the present invention provides a computer system having the magnetic disk unit as defined above.

In addition, the present invention provides a method for controlling a magnetic disk unit employing a sector servo system for positioning a head in accordance with servo information disposed in each sector, the method comprising the steps of: processing the servo information supplied from the head; identifying a particular operation mode of the magnetic disk unit other than a write or read operation, and generating a signal representing the particular operation mode; acquiring the servo information selectively in response to the signal; and controlling positioning of the head on the basis of the servo information selected.

The present invention does not use the complete servo information from all the sectors while in the idle state, but selects the servo information from every two or more sectors so that the position control of the head is performed with a minimum amount of servo information. Consequently, the power consumption can be reduced by the amount needed for computation for position control.

In addition, since the power of the write or read circuitry and some of the electric circuits of the servo system is turned off from the selected servo information to the next selected servo information, the power consumption is further reduced by that amount.

DETAILED DESCRIPTION OF THE PREFERRED EMBODIMENT

Next, an embodiment of the present invention is described in detail.

Figure 1A:
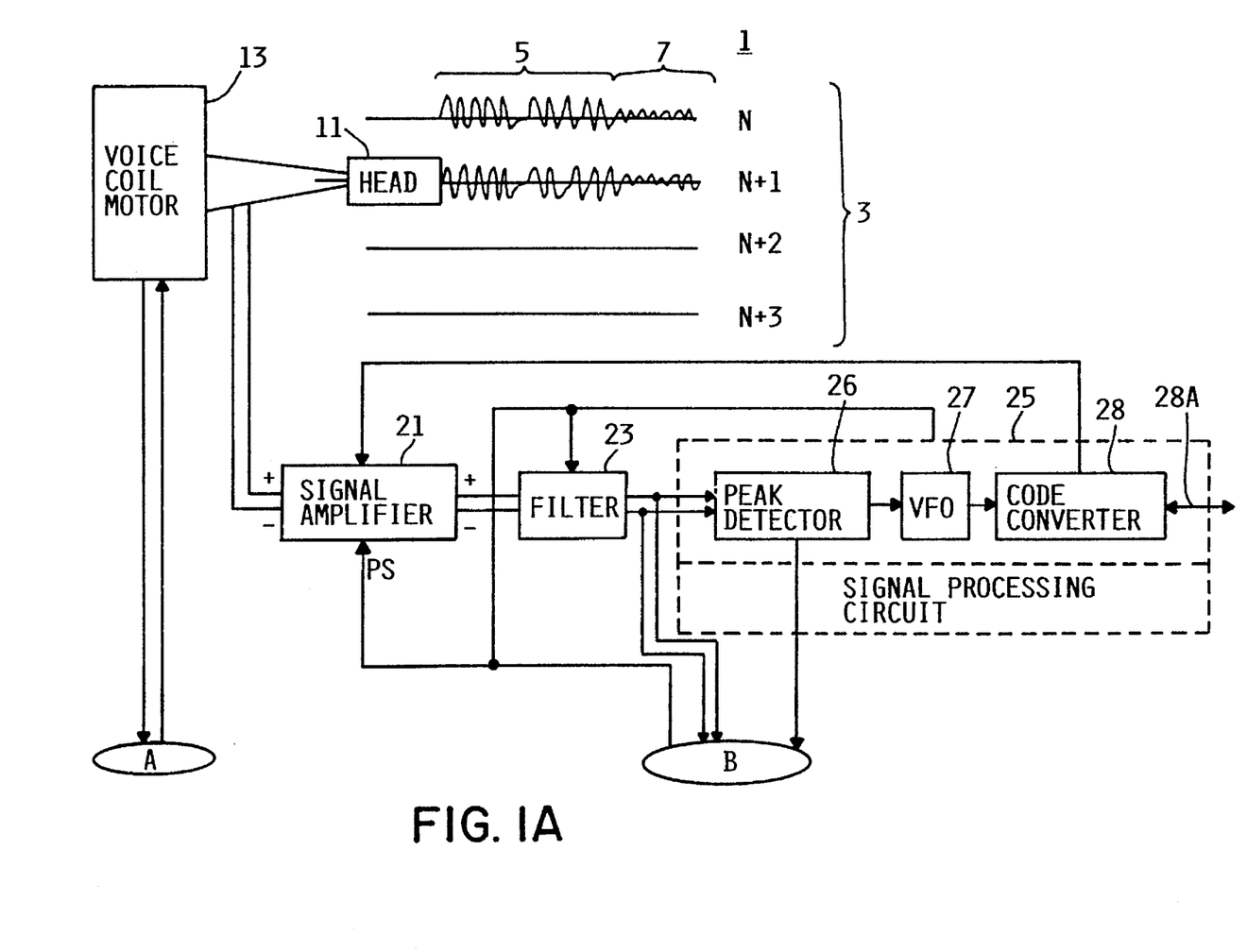
FIG. 1 is a block diagram showing an arrangement of an embodiment of a magnetic disk unit according to the present invention.
Figure 1B:
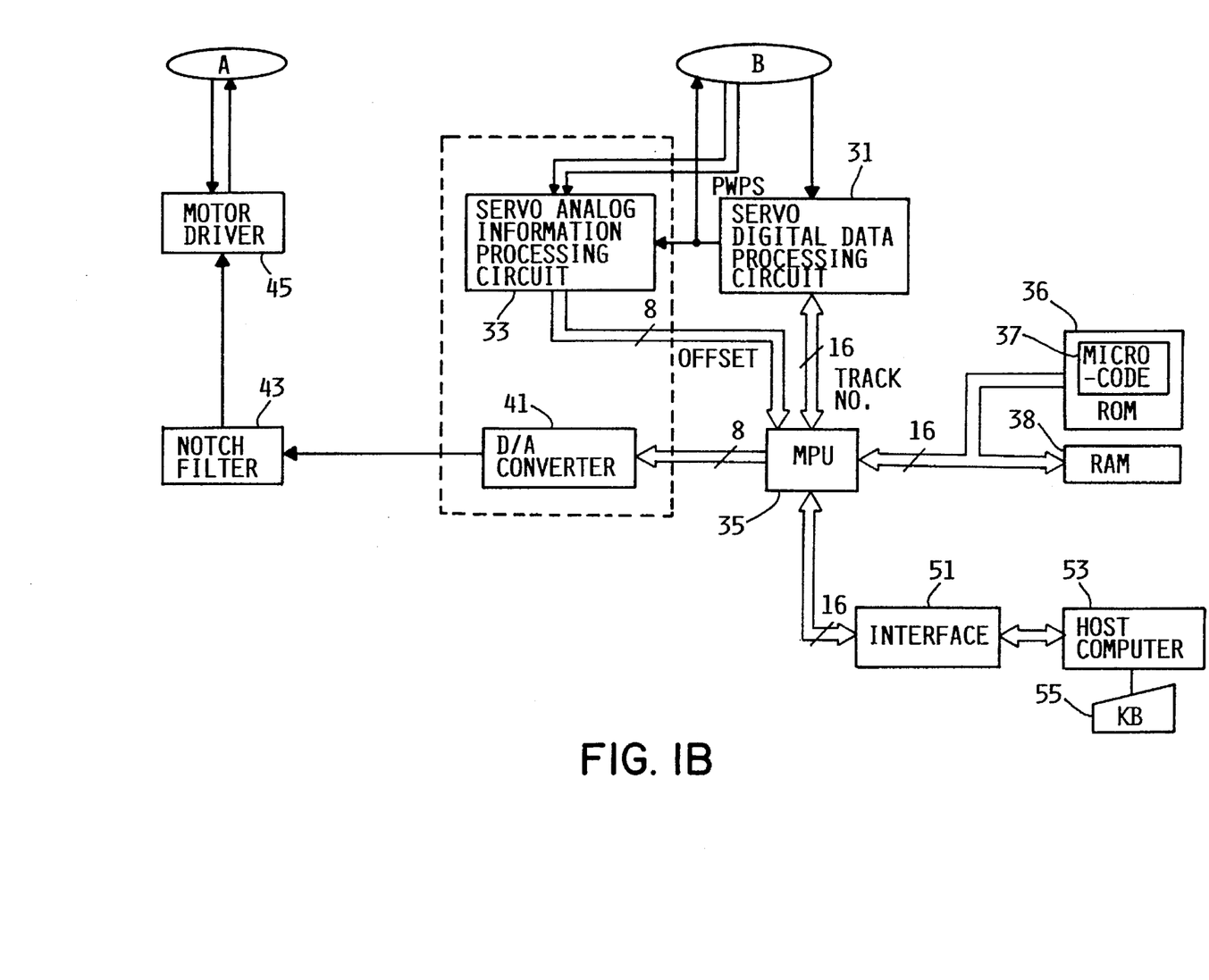

FIG. 1 shows an embodiment of the present invention. In this figure, reference numeral 1 designates a magnetic disk. A plurality of tracks 3 are concentrically disposed on magnetic disk 1. Further, 50 sectors are radially formed on magnetic disk 1, as shown in FIG. 2(C). At the head of each sector there is provided servo information 5, which is followed by data region 7. Servo information 5 contains digital servo information indicating a track number and analog servo information indicating an offset amount from the center of each track.

The reading of servo data 5, and the writing and reading of the data in data region 7 are performed by head 11. Specifically, head 11 is driven in the radial direction of magnetic disk 1 by voice coil motor 13 so that head 11 is moved on a designated track and accesses an addressed sector.

The output signal of head 11 is amplified by signal amplifier 21. The output of signal amplifier 21 is subjected to noise removal with filter 23, and is supplied to signal processing circuit 25. Signal processing circuit 25 comprises peak detector 26, VFO (variable frequency oscillator) 27 and code converter 28. Circuit 25 converts the read signal into digital data and sends it to a hard disk controller (not shown) connected to line 28A. A write signal, on the other hand, is sent from the hard disk controller to code converter 28, and then to signal amplifier 21, so that it is converted from digital data to an analog signal, and is then fed to head 11.

Servo information 5 read by head 11 is separately processed by two circuits. That is, the digital servo information including the track number is supplied through peak detector 26 of signal processing circuit 25 to servo digital data processing circuit 31 to be detected and processed there; and the analog servo information containing the offset information is sent from filter 23 to servo analog information processing circuit 33 to be detected and processed there. The outputs of these circuits 31 and 33 are sent to MPU (microprocessing unit) 35. MPU 35 performs seek and following control of head 11 in response to a write or read command, and supplies D/A converter 41 with the output obtained by computation based on the command and servo information 5. The output of D/A converter 41 is supplied to voice coil motor 13 through notch filter 43 and motor driver 45, thus moving head 11.

ROM 36 and RAM 38 are connected to MPU 35. ROM 36 stores microcode 37. Microcode 37 is transferred from ROM 36 to RAM 38 when the power is turned on, and performs sector skipping control described below. RAM 38 contains a group of registers used during the sector skipping control.

MPU 35 is connected to host computer 53 through interface circuit 51, and receives various commands therefrom. Keyboard 55 is connected to host computer 53.

Next, the power system of such an arrangement is explained. MPU 35 detects the termination of processing of a write or read command sent from host computer 53. Then, finding that the next command has not yet arrived at interface 51 from host computer 53, MPU 35 sends to servo digital data processing circuit 31 via a 16-bit bus, a signal representing the initiation of the idle state, and parameters A', B' and C' for the idle state, which will be described later. Servo digital data processing circuit 31, responding to the signal representing the initiation of the idle state, generates, by using the parameters, a power control signal PWPS based on servo information 5. The signal PWPS, which turns on and off the power of respective circuits, is supplied to power on/off terminals, such as power save terminals, of signal amplifier 21, filter 23, signal processing circuit 25, and servo analog information processing circuit 33. Here, signal amplifier 21, filter 23 and signal processing circuit 25 function as a data write and read means, whereas servo analog information processing circuit 33 functions as a means for processing the analog servo information.

Figure 2A:
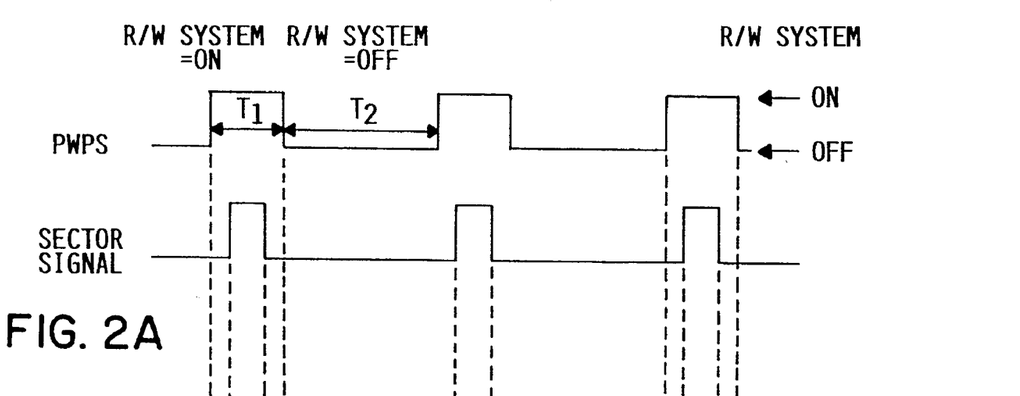
FIG. 2 is a diagram illustrating the timing of the power control signal PWPS of the above embodiment in comparison with the power control signal PWPS of the conventional example.
Figure 2B:
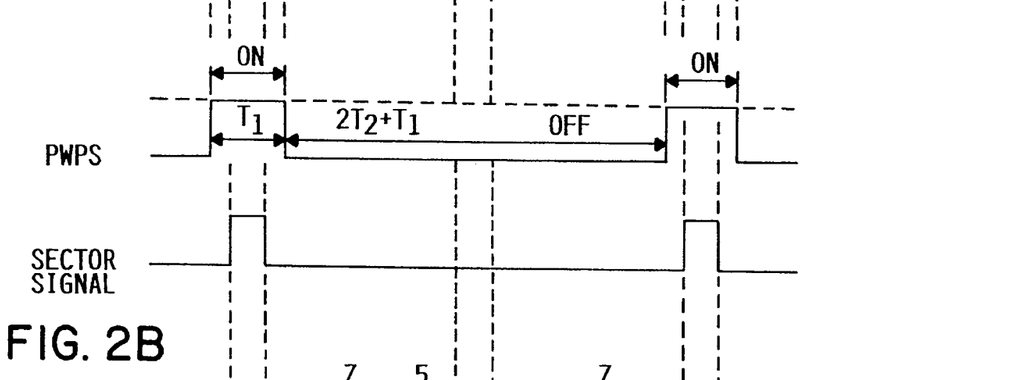
Figure 2C:
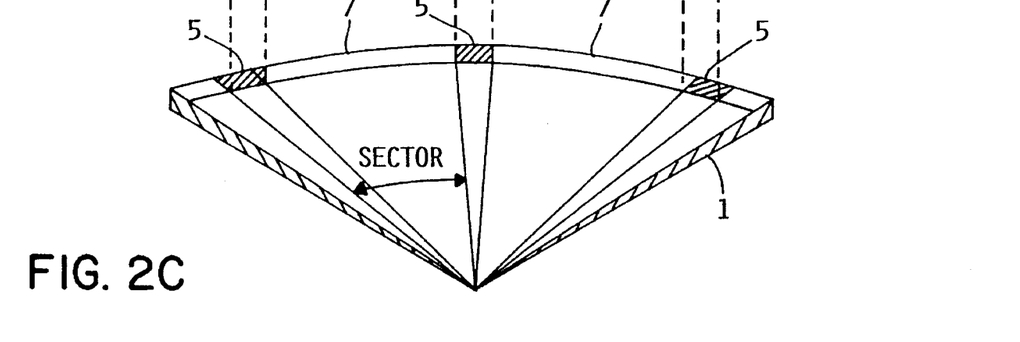

FIG. 2 illustrates, in comparison with a conventional system, the timing of the power control signal PWPS generated when head 11 is held on the same track. As shown in FIG. 2(A), the conventional system generates the power control signal PWPS for each sector synchronous with a sector signal produced for each sector. In contrast with this, this embodiment does not generate the power control signal PWPS for each sector, but generates the power control signal PWPS for every other sector as shown in FIG. 2(B). Assuming that the on-state duration of the power control signal PWPS is T1, and the period of the sector signal is T1+T2, the duty ratio of the power control signal of the conventional system is given by 100T1/(T1+T2), whereas the duty ratio of the embodiment is given by 100T1/2(T1+T2). In other words, the duty ratio of the embodiment is half that of the conventional system.

The above-mentioned control is carried out by microcode 37. Microcode 37 performs this control by using the following three parameters which are set in the registers placed in RAM 38:

A. A parameter for determining the timing (period) for reading servo information 5.

B. A feedback parameter for performing the stable servo control.

C. A parameter for determining the duty ratio of the power control signal PWPS.

Figure 3A:
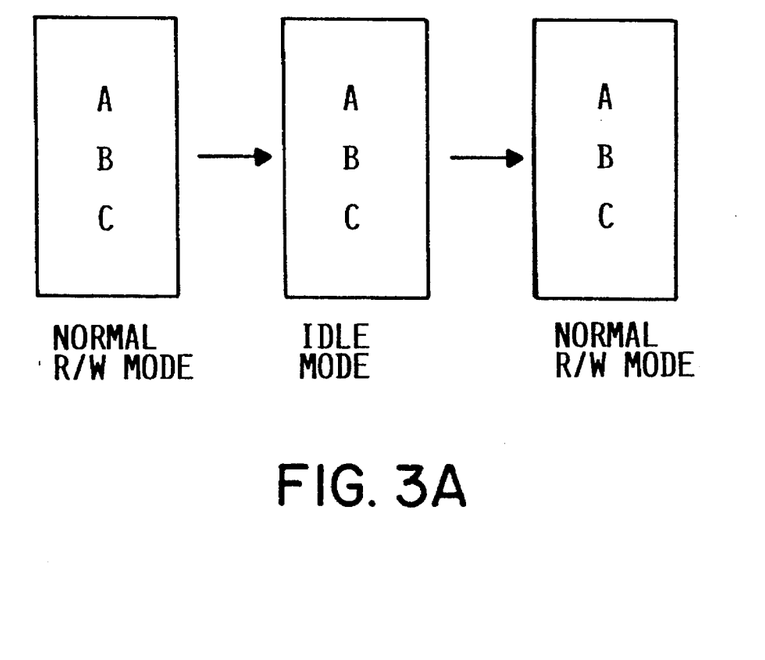
FIG. 3 is a block diagram illustrating a method for setting the parameters of the above embodiment in comparison with that of the conventional example.
Figure 3B:
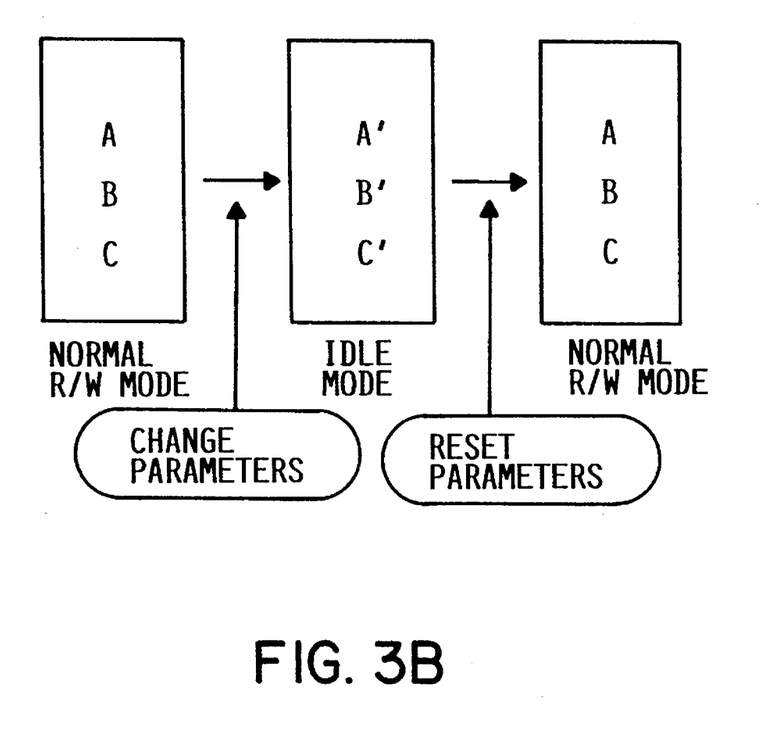

The conventional system uses without change the three parameters A, B, and C which have been already set in the registers, when the system shifts from the write or read mode to the idle mode, as shown in FIG. 3(A). The system of the present invention, on the other hand, simultaneously replaces the three parameters A, B, and C with parameters A', B', and C' for the idle mode by using microcode 37 so that a new duty ratio is established when the system enters the idle state from the write or read mode, as shown in FIG. 3(B). Thus, the power control signal PWPS as shown in FIG. 2(B) is generated, and at the same time, the servo control is stabilized.

When interface 51 detects the arrival of a write or read command from host computer 53, it sends a signal representing this to MPU 35. In response to this signal, MPU 35 sends a signal representing the termination of the idle state, and sends the original parameters A, B, and C, to servo digital data processing circuit 31 via the 16-bit bus. Servo digital data processing circuit 31 holds the power control signal PWPS at the high level so that the recovery to the normal write or read operation on an identical track is achieved. More specifically, when a write or read command comes from host computer 53, microcode 37 replaces the three parameters A', B', and C' with the original parameters A, B, and C, again, and returns to the control for the write or read mode.

Figure 4:
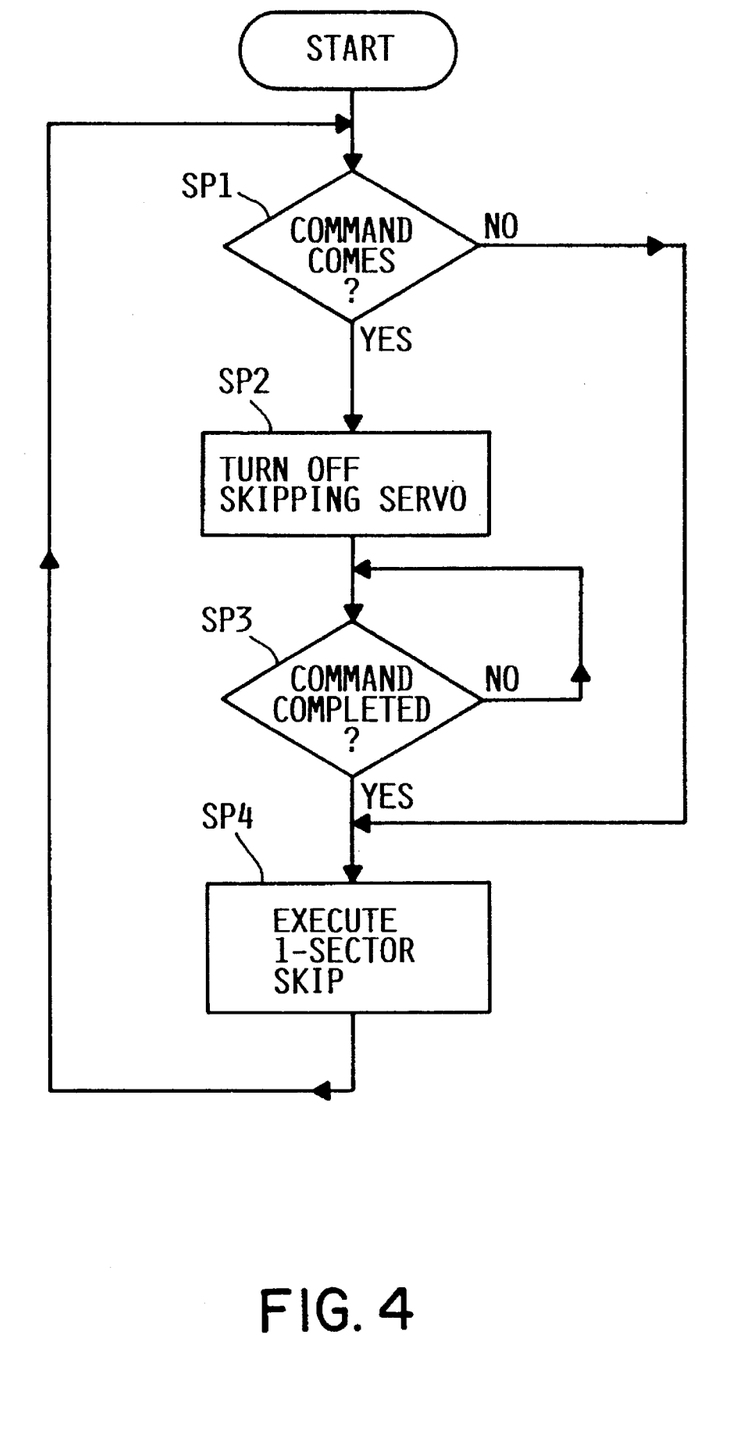
FIG. 4 is a flowchart illustrating the basic operation of the sector skipping control of the above embodiment.

FIG. 4 is a flowchart illustrating the control operation of microcode 37 when 1-sector skipping control is carried out. Here, the 1-sector skipping control refers to the position control of head 11 by using servo information 5 from every other sector. Receiving the information from interface 51 that a write or read command has come from host computer 53 at step SP1, microcode 37 turns off the skipping servo at step SP2. On receiving the information that the command has been completed at step SP3, microcode 37 performs the 1-sector skipping control in conjunction with servo digital data processing circuit 31 at step SP4. Specifically, microcode 37 substitutes the parameters, and servo digital data processing circuit 31 carries out the 1-sector skipping control in accordance with the parameters. As a result, servo digital data processing circuit 31 generates the power control signal PWPS as shown supplied to power on/off terminals, such as power save terminals, of signal amplifier 21, filter 23, signal processing circuit 25, and servo analog information processing circuit 33, thus achieving the power save control.

Figure 5:
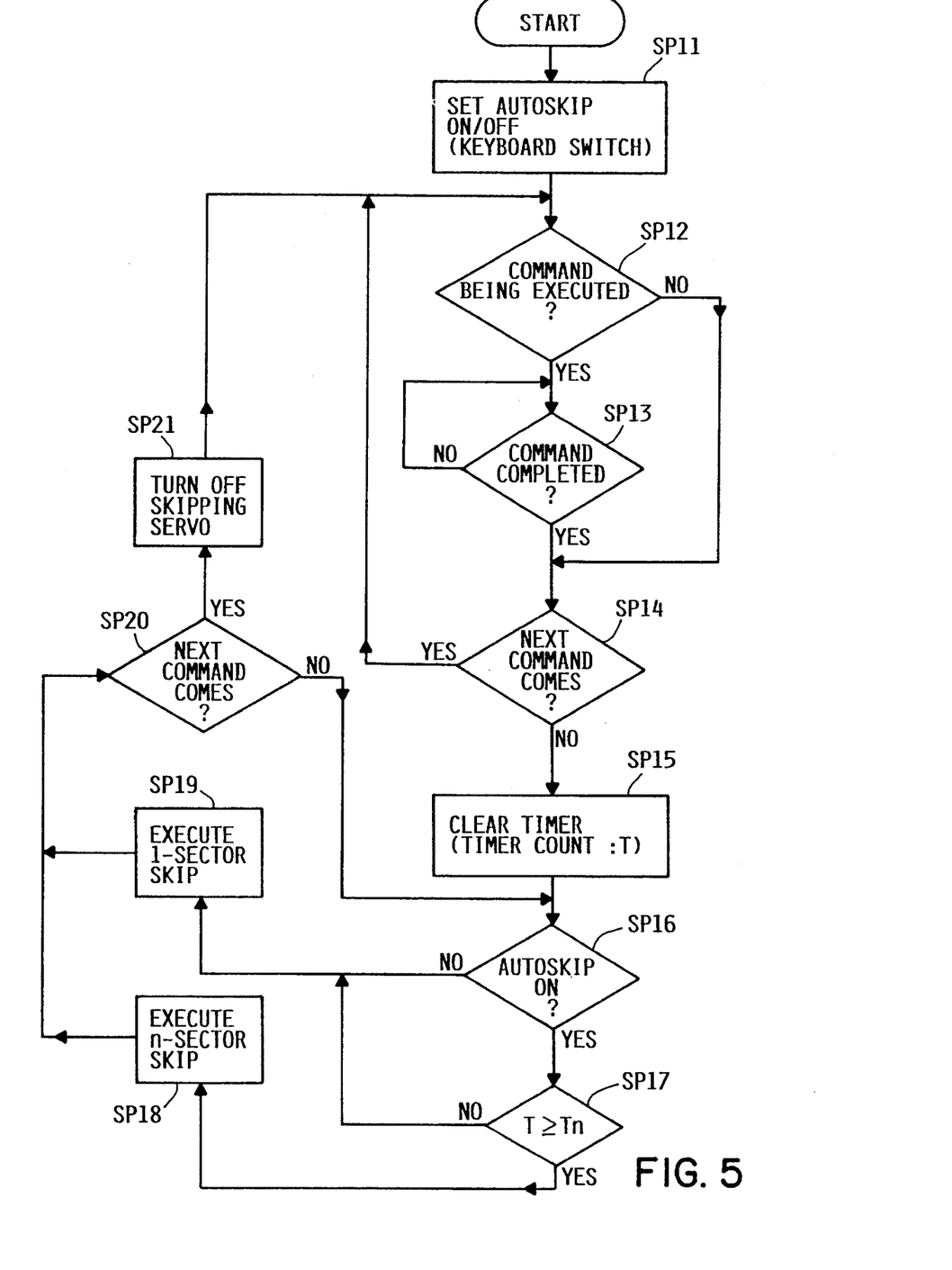
FIG. 5 is a flowchart illustrating the autoskipping operation in the sector skipping control of the above embodiment.

FIG. 5 is a flowchart illustrating an autoskipping operation in which the 1-sector skip or n-sector skip is automatically selected in accordance with the duration of the idle state. Here, n is an integer equal to or greater than two, which represents the number of sectors to be skipped. For example, when n=2, the servo information to be used for position control is read every three sectors.

At step SP11 of FIG. 5, a user enters an autoskipping command from keyboard 55. Microcode 37 enters into a wait state until MPU 35 terminates the command execution from step SP12 to SP13. When the command execution has been completed, microcode 37 decides whether or not the next command has arrived, and returns to step SP12 if the next command has arrived. Thus, the autoskipping operation is not carried out while commands continually arrive.

On the other hand, when the next command has not arrived, the autoskipping operation is started. In this case, microcode 37 starts a time count by clearing a timer at step SP15. This is performed so as to delay a time interval Tn before starting the n-sector skip. Subsequently, at step SP16, an autoskip is tested whether it is ON or OFF. If it is ON, n-sector skip is started at step SP18 after time Tn has elapsed.

When the autoskip is not ON at step SP16, or when the time interval Tn has not yet elapsed at step SP17, the 1-sector skip is started at step SP19. Subsequently, microcode 37 determines whether tile next command has come at step SP20, and carries out n-sector skip or 1-sector skip until the next command arrives. After detecting the next command at step SP20, microcode 37 turns off the skipping servo control at step SP21, and returns to step SP12. Thus, the 1-sector skip or n-sector skip is automatically selected and executed in accordance with the elapsed time until the next command comes so that more effective power save control is achieved.

The sector skipping control is performed by detecting the idle state. In the idle state, the average time Tavr until head 11 reaches the initial position of a target sector is equal to half the rotating time of magnetic disk 1: when the rotational speed of a spindle is 3,600 r.p.m., it is expressed by:

Tavr=16.66/2=8.33 msec.

In the sector skipping control, write or read becomes possible after five sectors have passed since the write or read command arrived. Accordingly, the time due to this delay is expressed by:

Tdly=0,333 5=1.665 msec.

where 0.333 is a time in which one sector passes. The sum of these times becomes about 10 msec.

Since the probability that two commands immediately before and after the idle state will access the same track is very small, a seek operation is usually executed before the command immediately after the idle state is performed. In this case, the access time is identical regardless of the presence or absence of the sector skip.

According to the present invention, during a seek operation in which the head moves from one track to another, servo digital data processing circuit 31 generates the power control signal PWPS as shown in FIG. 2(A), thus reducing power consumption during the seek operation. While the head is moving across the tracks, it is necessary to read only the servo information of each sector of each track, but not necessary to read from or write on data region 7 of each track. To achieve this, when the current operation is the seek operation, MPU 35 sends a signal representing the seek operation to servo digital data processing circuit 31 via the 16-bit bus. Servo digital data processing circuit 31, in response to that signal, sends the power control signal PWPS as shown in FIG. 2(A) to signal amplifier 21, filter 23, signal processing circuit 25 and servo analog information processing circuit 33. By this, these circuits are kept ON only while the power control signal PWPS is at the high level, and sends the servo information of each track to MPU 35. In contrast, while the power control signal PWPS is at the low level, these circuits are kept OFF. In the above-mentioned conventional technique, however, the power control signal PWPS as shown in FIG. 2(A) is used only while the head is held on an identical track, and is not used during the seek operation. This is different from the seek operation of the present invention, which uses the power control signal. PWPS during a seek operation.

The present invention applied to a 2.5 inch, 50 sector, 3,600 r.p.m. hard disk unit employing 1-sector skipping control, can reduce the total power consumption by about 20% in comparison with a conventional hard disk unit.

As described above, the present invention carries out the positioning of the head by using the sector skipping control in the idle state where the head is held on an identical track and no write or read operation is executed. More specifically, in the idle state, the present invention does not use the servo information from all the sectors, but selects the servo information from every other sector or from every three or more sectors so that the head positioning can be performed with only a minimum amount of servo information. The power to electric circuitry of the write or read system and the servo system which is not needed in the idle state is interrupted, from the arrival of the selected servo information to the arrival of the next selected servo information, by the power control signal generated in accordance with the timing of the sector. As a result, the power consumption can be reduced by that amount. In addition, the power consumption can be further reduced by the amount needed for computing for position control.

We claim:

1. A method for controlling a magnetic disk unit employing a sector servo system for positioning a head in accordance with servo information disposed in each of a plurality of discrete angularly spaced servo information regions, said method comprising the steps of:

processing said servo information supplied from said head;

identifying a particular operation mode of said magnetic disk unit other than a write or read operation, and generating a mode signal representing said particular operation mode;

acquiring said servo information selectively during a first time interval in response to said mode signal, wherein during said first time interval, said step of acquiring servo information comprises selectively acquiring said servo information from a first portion of said discrete angularly spaced servo information regions, said first portion being fewer than all of said discrete angularly spaced servo information regions;

acquiring said servo information selectively during a second time interval following said first time interval in response to said mode signal, wherein during said second time interval, said step of acquiring servo information comprises selectively acquiring said servo information from a second portion of said discrete angularly spaced servo information regions, said second portion being fewer than said first portion; and controlling positioning of said head on the basis of said servo information selected.

2. The method for controlling a magnetic disk unit as claimed in claim 1, wherein said particular operation mode is an idle mode in which writing or reading of data is not executed.

3. The method for controlling a magnetic disk unit as claimed in claim 1, further comprising the step of interrupting an operation of at least a part of a circuit needed for writing or reading data and of a circuit needed for reading said servo information except when said servo information is selected.

4. The method for controlling a magnetic disk unit as claimed in claim 1, wherein said servo information is selected from every Nth servo information region, where N is a positive integer greater than 1.

5. A disk drive employing a sector servo positioning system, comprising:

at least one rotating disk having a disk surface, said disk surface for recording data and servo information, said servo information being recorded in each of a plurality of discrete angularly spaced servo information regions;

a transducer head for accessing data recorded on said disk surface;

an actuator motor for positioning said transducer head;

position determination means for determining the position of said transducer head from said servo information recorded on said disk surface;

identifying means for identifying a particular operation mode of said disk drive other than a write or read operation;

selection means responsive to said identifying means for controlling said position determination means so as to determine the position of said transducer head from servo information recorded in selected servo information regions, wherein said selection means comprises:

(a) means for selecting a first selected portion of said servo information regions for determining the position of said transducer head during a first time interval, said first portion being fewer than all of the servo information regions encountered by said transducer head; and (b) means for selecting a second selected portion of said servo information regions for determining the position of said transducer head during a second time interval, said second portion being smaller than said first portion, said second time interval following said first time interval.

6. The disk drive as claimed in claim 5, wherein said particular operation mode is an idle mode in which writing or reading of data is not executed.

7. The disk drive as claimed in claim 5, wherein said selection means further comprises means for interrupting power to electrical circuits of said position determination means during intervals including when said transducer head encounters servo information recorded in servo information regions not selected by said selection means.

8. The disk drive as claimed in claim 7, wherein said selection means selects said servo information from every Nth servo information region, where N is a positive integer greater than 1.

9. The disk drive as claimed in claim 5, wherein said selection means selects said servo information from every Nth servo information region, where N is a positive integer greater than 1.

10. A disk drive employing a sector servo positioning system, comprising:

at least one rotatable disk having a disk surface, said disk surface for recording data and servo information, said servo information being recorded in each of a plurality of discrete angularly spaced servo information regions;

a transducer head for accessing data recorded on said disk surface;

an actuator motor for positioning said transducer head;

position determination means for determining the position of said transducer head from said servo information recorded on said disk surface;

power control means for controlling power to selected circuits used for reading data recorded on said disk surface;

actuator seek means for controlling said actuator motor to perform a seek operation from one track recorded on said disk surface to another track recorded on said disk surface;

wherein said power control means removes power to said selected circuits during a seek operation for a portion of the time that said transducer head is positioned between said discrete angularly spaced servo information regions, and supplies power to said selected circuits when said transducer head is position over said angularly spaced servo information regions.

* * * * *